May 7, 1940.  J. D. BOLESKY  2,199,388
THERMOSTATIC DEVICE
Filed Feb. 7, 1938  3 Sheets-Sheet 1

John D. Bolesky,
Inventor,
Delos F. Haynes,
Attorney.

May 7, 1940. J. D. BOLESKY 2,199,388
THERMOSTATIC DEVICE
Filed Feb. 7, 1938 3 Sheets-Sheet 2

John D. Bolesky,
Inventor,
Delos G. Haynes,
Attorney.

May 7, 1940.  J. D. BOLESKY  2,199,388
THERMOSTATIC DEVICE
Filed Feb. 7, 1938  3 Sheets-Sheet 3

John D. Bolesky,
Inventor,
Delor F. Haynes,
Attorney.

Patented May 7, 1940

2,199,388

UNITED STATES PATENT OFFICE 2,199,388

THERMOSTATIC DEVICE

John D. Bolesky, Attleboro, Mass., assignor to Metals & Controls Corporation, Attleboro, Mass., a corporation of Massachusetts Application February 7, 1938, Serial No. 189,075

5 Claims. (Cl. 200—138)

This invention relates to thermostatic devices, and with regard to certain more specific features, to thermostatic electric switches.

Among the several objects of this invention are the provision of a novel thermostatic switch which is adapted to break an electrical circuit on a rise of current injurious to the circuit; the provision of a thermostatic electric switch of the class described which while breaking the electrical circuit automatically, requires manual resetting to close the circuit; the provision of a manual reset thermostatic switch of the class described in which the circuit breaker mechanism is trip-free of the resetting handle; the provision of a switch of the class described including novel means for preventing flashover between parts of the opposite polarity; the provision of an electrical switch of the class described which includes a pressure chamber which functions to snuff out any incipient arc formation during the opening of the circuit; the provision of a switch of the class described which, because of its simplicity, economy of construction, and reliability and efficiency of operation, is peculiarly adapted for use as a motor overload protective device. Other objects will be in part obvious and in part pointed out hereinafter.

The invention accordingly comprises the elements and combination of elements, features of construction, and arrangement of parts which will be exemplified in the structures hereinafter described, and the scope of the application of which will be indicated in the following claims.

In the accompanying drawings, in which are illustrated several of various possible embodiments of the invention:

Figure 15:
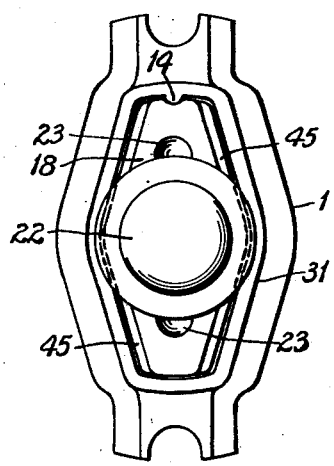
Figure 12:
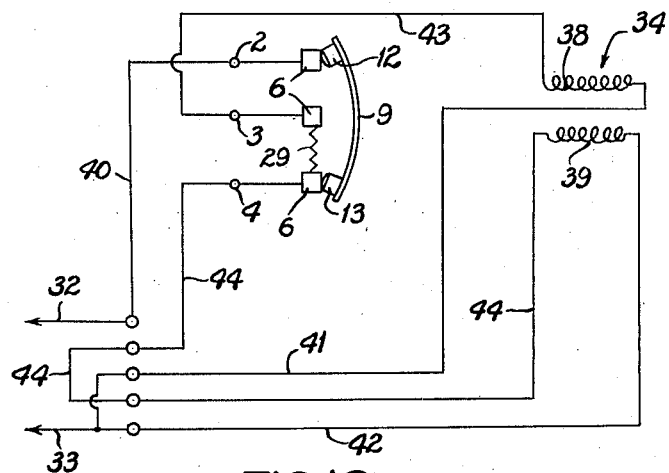
Figure 13:
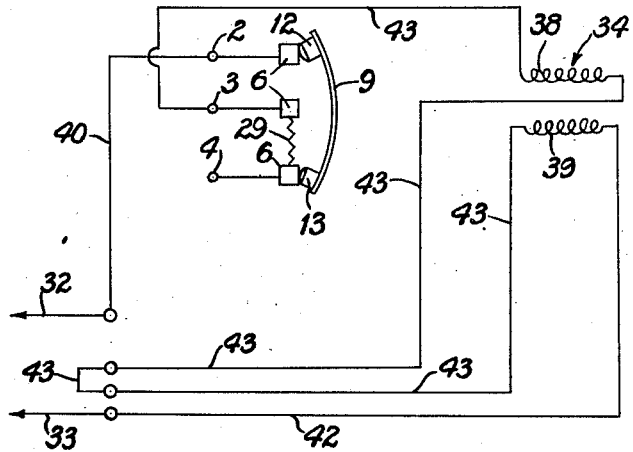
Figure 14:
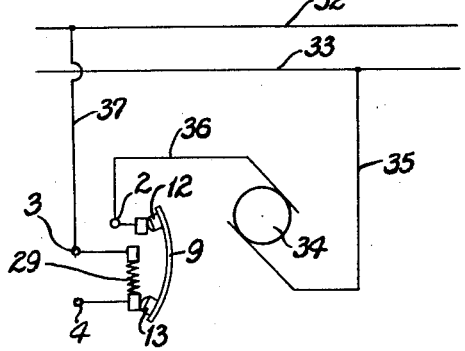

Figures 12, 13, and 14 are schematic electrical circuit diagrams illustrating various applications of the switch of the present invention; and Fig. 15 is a bottom plan view of an alternative form of switch embodying the present invention.

Similar reference characters indicate corresponding parts throughout the several views of the drawings.

The present invention concerns electrical switches of the thermostatically actuated type, which are used to break electrical circuits on the exceeding of a certain safe electrical current value in the circuit. More particularly, this invention concerns circuit-breaking thermostatic electric switches of the type just described, which are manually reset. Switches of this type are sometimes called thermal cutouts, and, more particularly when applied to electric motors, motor overload protective devices. The present invention may be properly called a manually reset motor protection thermostat, although it is of course applicable to devices other than motors.

As explained in my co-pending application Serial No. 158,107, filed August 9, 1937, thermal cutouts have hitherto been made in many forms, but one of the disadvantages of these is that in order to prevent what is known as "flashover" (that is, an arc from a contact of one polarity to a part of the device of opposite polarity) mica or other insulating means must be used around each of the contacts. If the current voltage characteristics of the circuit are high, relatively large insulators must be used, which insulators may occupy more space than the contacts themselves.

As also explained in said co-pending application, certain well-known standards have been set up by the Underwriters' Laboratories in the United States in respect to contact insulation, which standards must be met to obtain their approval of a device. These standards relate in part to the amount of electrical insulation (and the insulation may be air clearance or various forms of dielectric material) associated with each contact.

All of the various expedients used to meet the Underwriters' specifications so far have the distinct disadvantage of using space which is needed when designing small sized controls. One object of the present invention is to overcome this disadvantage of using needed space while at the same time providing safe flashover distances.

Another common disadvantage in thermal cutouts heretofore provided is that there is a distinct tendency for their contacts to arc. This tendency is present in nearly all forms of circuit breakers where the contacts operate in air. Attempts have been made to prevent said arcing either by using a plurality of contacts arranged in series connection so that each one of the contacts breaks only a part of the load current, or by increasing the complexity of the contact-actuating mechanism so that the break is so properly designed in rapidity and extent as to prevent such arcing.

Both of these expedients, however, are also disadvantageous not only because they take much needed space in the design of the control but they are also complicated to manufacture, and unduly increase the expense of the device. Another principle of this invention is to overcome arcing in a manner which does not greatly increase the complexity of the switch and which requires but a minimum of insulation.

Thermal cutouts of the type with which the present invention is concerned are of particular utility in connection with the protection of electrical motors from overloads in their circuits caused by mechanically overloaded motors, or overvoltage, and the like. Accordingly, the embodiment of the invention shown in the drawings and hereinafter described is in the form of a motor protection device.

Furthermore, in many cases it is of advantage to have a motor protective device which, upon overvoltage or overload on the motor, will open the circuit, thus stopping the motor; but which will not automatically reset itself and start the circuit again, that is to say, the device must be manually reset. This provides that personal attention must be given to the starting switch and associated circuit, which eliminates many of the hazards now present in a highly-mechanized device or place where motors are used. However, it will clearly be understood that the invention may take other forms for other uses, within the scope of the invention, and it is further to be noted that the actual embodiments shown and described are of utility for applications other than motor protection.

Figure 1:
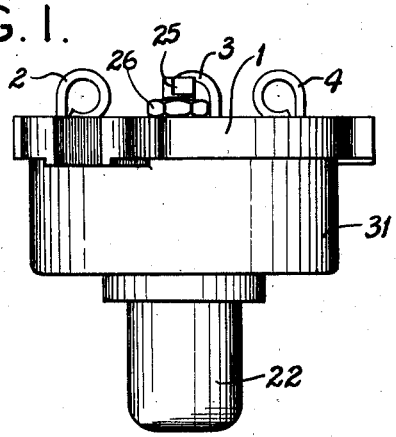
Fig. 1 is a side elevation of a switch embodying the present invention.
Figure 2:
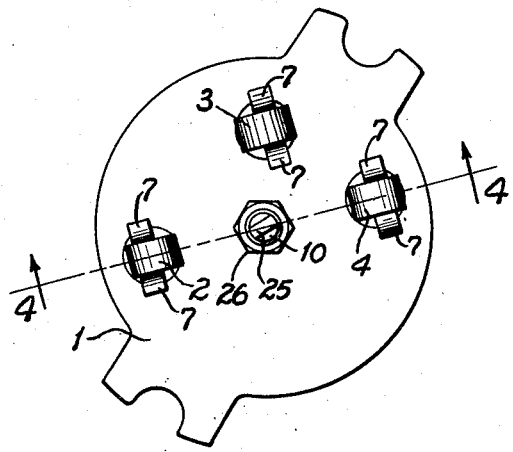
Fig. 2 is a top plan view of the switch of Fig. 1.
Figure 3:
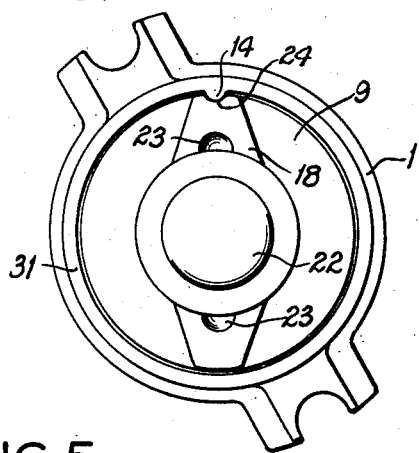
Fig. 3 is a bottom plan view of the switch of Fig. 1.
Figure 4:
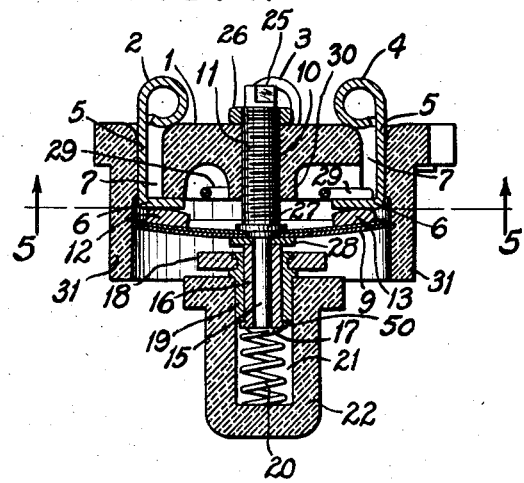
Fig. 4 is a cross section taken substantially along line 4—4 of Fig. 2.
Figure 11:
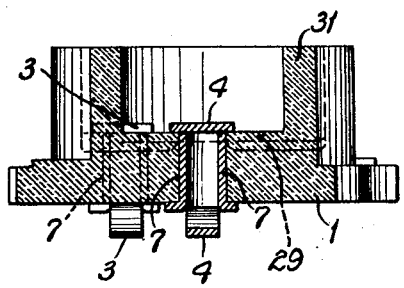
Fig. 11 is a cross section taken substantially along line 11—11 of Fig. 5.

Referring now more particularly to Figures 1 through 5, numeral 1 indicates a base member, preferably made of molded electrical insulating material which is heat-resistant to a fair degree, such as phenolic condensation products, or the like. Holes are provided in the base in which the terminal lugs 2, 3, and 4 are placed. The lugs 2, 3 and 4 are all substantially identical, and individually comprise stampings from sheet metal, as shown more particularly in Figures 7 and 8. Each of lugs 2, 3, and 4 comprises a shank portion 5, one end 6 of which is bent over at right angles to form a contact plate. Wings 7 are provided on the sides of the shank portion 5, and are bent at right angles thereto in order to brace the structure as a whole, and to provide added support for the contact plate end 6. The wings 7 are relieved at their lower ends from the shank 5, by slots 8. In assembly, each terminal piece is dropped into its hole in the base member 1 in such manner that the free end of the shank 5 extends from the top (Figures 1, 4, and 11) of said base member. The ends of the wings 7 that are freed by the slots 8 are then bent apart, in a spreading manner, to clamp the terminal lugs against the base, as shown in Fig. 11. The free end of the shank 5 may then be rolled to approximately circular cross section, as indicated in Figures 1 and 4, in order to provide convenient means for making electrical connections to the switch.

The operating faces of the contact plate portions 6 of each of the terminal lugs are preferably plated or otherwise provided with a silver or other good contact metal coating.

Numeral 9 indicates a composite thermostatic metal or bimetal disc preferably made in accordance with the teachings of John A. Spencer Patent No. 1,448,240. A characteristic of this disc 9 is that it is capable upon the application of heat thereto of snapping from one position of convexity to a position of opposite convexity with a snap-action, and yet is unable, upon cooling to a degree that would be ordinarily encountered in the locality where the thermostat is placed, to snap back to its former position. Disc 9 is mounted upon a hub 10 in such manner as to rotate freely thereon. Hub 10 is threadably fitted into a central hole 11 in the base member 1. Mounted securely, as by welding, on the inner face of disc 9 are a pair of contact buttons 12 and 13, which are positioned to engage contact plate portions 6 of terminal lugs 2 and 4, respectively. A small projection 14 on the inside wall of base member 1 (see Fig. 5) serves to engage a small notch cut in the rim of disc 9 to prevent it from turning when screw 10 is turned, and keep contacts 2 and 12 and 4 and 13 respectively aligned throughout the operation of the device.

An axial extension 15 of hub 10 is slidably fitted into a sleeve 16 and the end of extension 15 is upset or riveted over as shown at numeral 17. At the end of sleeve 16 is an annular flange 50. A push plate 18 is riveted, as shown, to the end of a sleeve 19. The assembly 18, 19 is slipped over sleeve 16 before the end of extension 15 is riveted over, and is free to move on sleeve 16, its movement being limited by the under side of flange 50. A spring 20 is dropped into a hole 21 suitably bored or molded in a knob 22. One end of spring 20 bears against the riveted-over end 17 of extension 15. Sleeve 19 is a squeeze-fit in hole 21. Thus, the assembly of the knob 22, sleeve 19, and push plate 18, slides as a unit on sleeve 16 to and from the disc 9, with the spring 20 serving to push the assembly outwardly from the disc 9 when the knob 22 is released, until sleeve 19 abuts flange 50.

Figures 9, 10:
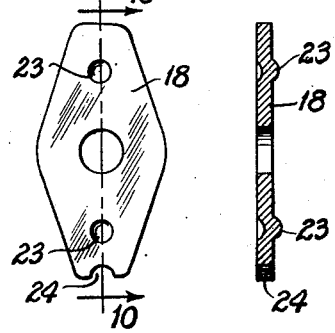
Fig. 9 is a plan view of a switch plate.
Fig. 10 is a cross section taken substantially along line 10—10 of Fig. 9.

The push plate 18 is shown in greater detail in Figures 9 and 10, where it will be seen that it comprises a generally blunt-ended diamond-shaped piece with a central hole therein for receiving the end of sleeve 19. Bosses 23 are stamped or otherwise formed in the push plate 18 in order to actually engage the face of thermostatic disc 9 in a two-point contact manner. A suitable notch 24 in the end of push plate 18 engages the projection 14 on the inside wall of base member 1 and prevents plate 18 from turning relative thereto.

By means of a square head 25 on the outer end of screw 10, disc 9 is pulled in and adjusted for its operating temperature. A lock nut 26 serves to hold screw 10 in position. Suitable abutments and shoulders 27 and 28 serve to hold disc 9 in its proper place on screw 10.

Figure 5:
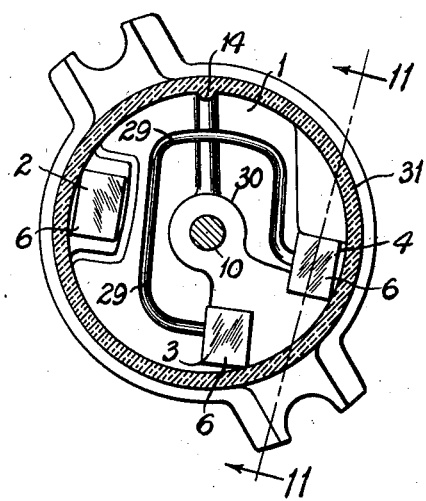
Fig. 5 is a cross section taken substantially along line 5—5 of Fig. 4.
Figure 7:
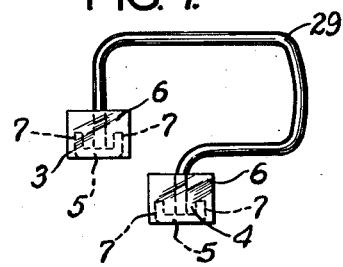
Fig. 7 is a plan view of an assembly of a heater element and terminal pieces.
Figure 8:
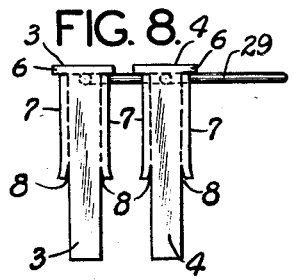
Fig. 8 is a side elevation of the assembly of Fig. 7, prior to incorporation in the finished switch.

A heater wire 29 is suitably fastened, either by spot-welding or soldering, to the under inside surface of contact plate portions 6 of terminal lugs 3 and 4 as shown in Fig. 5, and in Figures 7 and 8. The heater wire 29 runs around a suitable boss 30 on the inside of the base member 1 and lies in the groove thus formed.

The base member 1 is provided with an upstanding skirt or rim 31 which surrounds and closely encloses the periphery of the thermostatic disc 9. This skirt or rim 31 should be high enough to meet any of the flashover requirements mentioned above. The inner surface of the skirt 31 carries the molded bead or projection 14 of which mention has been made above.

By reason of the provision of skirt 31, and by reason of the fact that the base member as a whole is made of electrical insulating material, the switch as a present invention requires much less space than prior thermal cutouts. Furthermore, manufacturing operations involving the use of insulated washers, mica and like material, with their consequent costs, are all avoided.

In the assembled switch of the present invention, just enough clearance is left between the outer periphery of the thermostatic disc 9 and the inside wall of the skirt 31 to allow the disc to move freely. The resulting space enclosed by the disc in the inside of the base member is small. If an arc occurs between the contacts, air pressure, due to heating, builds up so rapidly that before it can leak out past the outer periphery of the thermostatic disc 9, the ensuing pressure snuffs out the arc. This feature of the present invention is claimed in my copending application Serial No. 158,107, filed August 9, 1937.

A feature of the switch of the present invention is that the thermostatic element 9, constituting the actual circuit-controlling element, is trip-free of the resetting handle 22. In other words, should the handle 22 for any reason stick in its resetting position (as upon breakage of the spring 20, seizure of the sleeve 19 upon the sleeve 16, or the like), the thermostat 9 is nevertheless free to snap into circuit-open position, if current or thermal conditions urge it to do so. This means, in one respect, that the switch is proof against tampering, as the mere blocking of the knob 22 in resetting position will not prevent the switch from operating as a safety switch under overload conditions. It will be appreciated that if a motor is consistently overloading, or consistently drawing excess current, the cause thereof should be corrected instead of locking the safety switch in inoperative position.

The trip-free characteristic of the disc 9 is explained as follows: When the handle 22 is in its most forward resetting position (i. e., push-plate 18 abuts shoulder 28) the projections 23 thereof engage the surface of disc 9 to just barely move said disc past its central point, i. e., just barely to overcenter it. If the disc for any reason is still hot (that is, near albeit below the temperature at which it snapped open, the maximum movement of the push plate will not overcenter the disc back to its circuit making position. Conversely, if the push plate is jammed or otherwise locked in its most forward resetting position, it will not prevent disc 9 from snapping open on suitable rise of temperature thereof. The resetting means of the present invention will act to permanently reclose the switch only after the disc has cooled appreciably from the temperature at which it snapped open.

Figures 12, 13 and 14 show several circuits for motor protection in which a switch made in accordance with the present invention is utilized. The simplest circuit is shown in Fig. 14, to which attention is now directed. Numerals 32 and 33 indicate power lines, while numeral 34 indicates, diagrammatically, a motor. A wire 35 connects one terminal of the motor to one of the power lines 33. Another wire 36 connects the other motor terminal to the terminal lug 2 of the switch of the present invention. In this circuit, the terminal lug 4 of the switch is not utilized for exterior connection, but the terminal lug 3 is connected, as by wire 37, to the opposite power line 32. Tracing the circuit connection, with the switch closed, it will be seen that power passes from supply line 33 to wire 35, to the motor 34, and then through wire 36 to terminal lug 2, to contact button 12 on disc 9, through disc 9, to contact button 13 on disc 9, to terminal lug 4, and then through resistance heater wire 29 to terminal lug 3, and finally by wire 37 to the other power supply line 32.

It is advantageous, when the device of the present invention is used as a motor protective device, to mount it directly on the motor. It is then subjected not only to heat developed in the heating wire 29, but to the heat developed in the motor itself.

Figure 6:
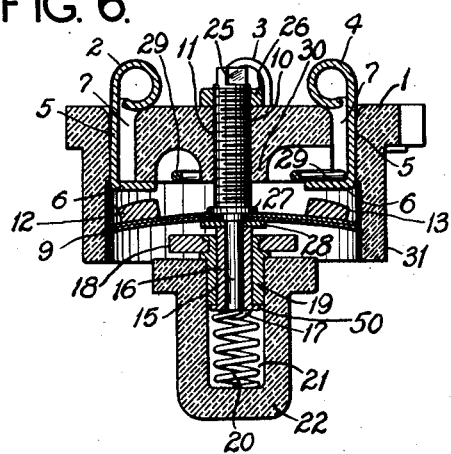
Fig. 6 is a cross section similar to Fig. 4, illustrating certain operating parts in an alternative position.

The heat developed by an electrical circuit is, of course, proportional to the product of the square of the current and the resistance. Heater wire 29 has a relatively low resistance. The thermostatic disc 9 itself also has a low resistance. Under normal motor loads, the current flowing to the heating wire 29 and thermostatic disc 9 is not large enough to cause either the wire 29 or the disc 9 to heat up sufficiently to make the disc 9 snap over. However, if the rotor of the motor becomes stalled, the current in the circuit will greatly increase over normal value, to an extent sufficient that heater 29 and disc 9 immediately become hot enough to cause thermostatic disc 9 to snap over to its position as shown in Fig. 6. This breaks the electrical circuit to the motor, by separating contact buttons 12 and 13 from their respective terminal lugs 2 and 4, before the motor becomes sufficiently overheated to become damaged.

Or, in the alternative, the rotor of the motor may not stall, but may have so much of a load on it that the motor begins to overheat. The reason for this overheating is that an overloaded motor draws more current than its normal amount. Then heater 29 and disc 9 will become slightly hot, but probably not hot enough to snap disc 9 over. However, if the motor itself then begins to approach a dangerous heat, this additional heat is carried by convection and/or radiation to the disc 9 and this will purposely be sufficient to cause disc 9 to snap over and break the circuit.

The temperature at which the disc is set to snap from circuit-closed position to circuit-open position may be regulated in accordance with temperature desired, preferably by manipulation of the screw stud 10. This is ordinarily a factory adjustment. The temperature at which the disc snaps back from open-circuit position to closed-circuit position is purposely made low (below any normal temperature that it may normally be expected to encounter) so as to require manual setting. After the disc has snapped to its open-circuit or Fig. 6 position, it will be found that a push on knob 22 will move push plate 18 so that the two projections 23 on plate 18 will bear against the disc 9 and a further slight push inward will serve to snap the disc over to its closed-circuit or Fig. 4 position.

Fig. 12 indicates a more complicated circuit arrangement, wherein it is possible to use a single motor-protection thermostat in accordance with the present invention to protect a motor which is wired for use either on a high or a low voltage, such as, for example, 220 volts or 110 volts. Motors of this type are sometimes called "Dual voltage motors." When used on high voltage, the motor windings are connected in series, and when used on low voltage, the motor windings are connected in parallel. In Fig. 12, the power lines are again represented by numerals 32 and 33. Numerals 38 and 39 represent the motor windings of the motor 34. One of the power lines 32 is connected by a wire 40 to the terminal lug 2 of the switch. The other power line 33 is connected by a wire 41 to one of the terminals of the motor winding 38, and by a wire 42 to one of the terminals of the motor winding 39. The other terminal of the motor winding 38 is connected by a wire 43 to the terminal lug 3 of the switch. The other terminal of the motor winding 39 is connected by a wire 44 to the terminal lug 4 of the switch. Tracing the circuit thus provided, it will be seen that power passes to the motor winding 38 in the following manner: From line 32 through wire 40 to terminal lug 2, to contact plate 6 thereof, through contact button 12, disc 9, and contact button 13, to contact plate 6 of terminal lug 4, through heater wire 29 to contact plate 6 of terminal lug 3, through terminal lug 3 and wire 43 to the motor winding 38, and through wire 41 back to power line 33. In this circuit, it will be seen, the motor winding 38 and the resistant heater 29, are in series.

Still referring to Fig. 12, power passes to the motor winding 39 in the following manner: From power line 32 through wire 40 to terminal lug 2, to contact plate 6 thereof, to contact button 12, through disc 9, to contact button 13, to terminal plate 6 of terminal lug 4, through terminal lug 4 and wire 44 to motor winding 39, and then by wire 42 to power line 33.

When the disc 9 snaps to open-circuit position, it will readily be seen that the supply of power to both the motor winding 38 and the motor winding 39 is disconnected.

Fig. 13 indicates the manner in which the switch may be used to control a motor in which the motor windings are connected in series across, say, a 220-volt source represented again by power lines 32 and 33. Wires 40, 42, and 43 are connected in the same manner as in the Fig. 12 circuit. Terminal lug 4 of the switch is left unconnected exteriorly, as in the Fig. 14 embodiment. The motor windings 38 and 39 are connected in series by a wire 43. Tracing the power supply in this circuit, it will be seen that the flow of current is as follows: From power line 32 through wire 40 to terminal lug 2, to contact plate 6 thereof, to contact button 12, to disc 9, to contact button 13, to contact plate 6 of terminal lug 4, through heater wire 29, to contact plate 6 of terminal lug 3, to terminal lug 3, to wire 43, to motor winding 38, through wire 43 to motor winding 39, and through wire 42 to power line 33. It will thus be seen that the heater wire 29, motor winding 38, and motor winding 39 are all connected together in series across the power line.

In both the embodiments of Figures 12 and 13, the operation of the thermostatic switch is substantially the same as described in connection with the Fig. 14 embodiment.

In some cases it may be advantageous to make thermostatic disc 9 in shape other than circular shape of the embodiment of Fig. 1 through Fig. 6. This may readily be done, without change of principle of the invention. By way of example, Fig. 15 shows an embodiment of the invention wherein the thermostatic disc 45, replacing the disc 9, has an outer periphery of generally blunted-end diamond shape, similar to that of the push plate 18. Any other shape desired, such as polygonal, rectangular, elliptical, or the like, may be used at will. The skirt 31 of this embodiment is arranged to conform to the periphery of the disc 45, thus to provide the pressure chamber arrangement hereinbefore mentioned. The heater wire 29 is either re-shaped to fit in the skirt 31, as now arranged, or it may be omitted within the scope of the invention. The positioning of the terminals 3, 4, and 5, and of the contact buttons 12 and 13, is of course altered to conform to the different shape of thermostatic disc.

While the present invention apparently finds its greatest utility in connection with electric switches, it will clearly be seen that it also applies to other devices to be controlled, such as valves (the valve elements merely replacing the contact elements of the switch embodiments of the invention).

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic device comprising a base member, supporting means mounted thereon, a snap-acting thermostat mounted on said supporting means and spaced from said base member, said thermostat having two oppositely facing positions of stability in one of which positions it is located relatively closer to said base member, said thermostat passing automatically from its said closer position to its other position upon rise of temperature to a predetermined value, but being incapable, under normal temperature variations, of returning to its said closer position automatically upon subsequent drop of temperature, manually operable means movably mounted with relation to said base member to react against said thermostat, spring means urging said manual means to an extended position away from said thermostat, said manual means including means adapted to bear upon the surface of said thermostat when said thermostat is in its said other position and said manual means is actuated against said spring means, and to urge said thermostat towards its said closer position, and means limiting the movement of said manual means toward said thermostat so that said bearing means is incapable of holding the thermostat in its closer position, whereby said thermostat is completely trip-free of said manual means.

2. A thermostatic device comprising a base member, supporting means mounted thereon, a snap-acting thermostat mounted on said supporting means and spaced from said base member, said thermostat having two oppositely facing positions of stability in one of which positions it is located relatively closer to said base member, said thermostat passing automatically from its said closer position to its other position upon rise of temperature to a predetermined value, but being incapable, under normal temperature variations, of returning to its said closer position automatically upon subsequent drop of temperature, manually operable means movably mounted with relation to said base member to react against said thermostat, said manual means including means adapted to bear upon the surface of said thermostat when said thermostat is in its said other position and said manual means is actuated, and to urge said thermostat towards its said closer position, and means limiting the movement of the said manual means toward said thermostat so that said manual means is incapable of holding the thermostat in its closer position, whereby said thermostat is completely trip-free of said manual means.

3. A thermostatic device comprising a base member, supporting means mounted thereon, a snap-acting thermostat mounted on said supporting means, said thermostat having two positions of stability, said thermostat passing automatically from its first position to its second position of stability upon change of temperature to a predetermined value, but being incapable under normal temperature variation of automatically returning to its first position, manually operable means movably mounted with relation to said base member to react against said thermostat, said manual means including means adapted to bear upon the surface of said thermostat when said thermostat is in said second position and said manual means is actuated, and adapted to urge the said thermostat toward its said first position, and means limiting the movement of said manual means toward said thermostat so that said manual means is incapable of holding said thermostat in its said first position, whereby said thermostat is completely trip-free of said manual means.

4. A thermostatic device comprising a base member, supporting means mounted thereon, a snap-acting thermostat mounted on said supporting means, means actuated by said thermostat, said thermostat having two positions of stability, said thermostat passing automatically from its first position to its second position of stability upon change of temperature to a predetermined value, but being incapable under normal temperature variations of automatically returning to its said first position, manually operable means movably mounted with relation to said base member to react against said thermostat, said manual means including means adapted to bear upon the surface of said thermostat at at least one point spaced from the point of engagement of said thermostat with said actuated means when said thermostat is in its said second position and said manual means is actuated, and adapted to urge said thermostat toward its said first position, and means limiting the movement of said manual means towards said thermostat so that said manual means is incapable of holding said thermostat in its said first position, whereby said thermostat is completely trip-free of said manual means.

5. A thermostatic device comprising a base member, supporting means mounted thereon, a snap-acting thermostat mounted on said supporting means, said thermostat having two positions of stability, said thermostat passing automatically from its first position to its second position of stability upon change of temperature to a predetermined value, but being incapable under normal temperature variations of automatically returning to its said first position, manually operable means movably mounted with relation to said base member to react against said thermostat, said manual means including means adapted to bear upon the surface of said thermostat when said thermostat is in said second position and said manual means is actuated, and adapted to urge the said thermostat toward its said first position, and means limiting the movement of said manual means toward said thermostat so that said manual means is incapable of moving the thermostat to its said first position unless the temperature of said thermostat has changed in a reverse direcion to a temperature on the original side of said predetermined value, or of holding said thermostat in its said normal position, whereby said thermostat is completely trip-free of said manual means.

JOHN D. BOLESKY.